United States Patent [19]

Bailey, Jr.

[11] Patent Number: 4,546,523
[45] Date of Patent: Oct. 15, 1985

[54] SAFETY HOOK CONSTRUCTION

[75] Inventor: James T. Bailey, Jr., Van Buren, Ark.

[73] Assignee: United States Forgecraft Corporation, Fort Smith, Ark.

[21] Appl. No.: 563,141

[22] Filed: Dec. 19, 1983

[51] Int. Cl.$^4$ ............................................. A44B 13/00
[52] U.S. Cl. .............................. 24/241 PP; 24/241 P; 24/234
[58] Field of Search .......... 24/241 P, 241 PP, 241 PS, 24/233, 234

[56] References Cited

U.S. PATENT DOCUMENTS

| | | | |
|---|---|---|---|
| 1,193,516 | 8/1916 | Clarke | 24/241 PP |
| 1,521,811 | 1/1925 | Hartbauer | 24/233 |
| 1,672,710 | 6/1928 | Chittenden | 24/233 |
| 1,879,168 | 9/1932 | Freysinger | 24/234 |
| 2,491,143 | 12/1949 | Weiss | 24/241 P |
| 2,514,656 | 7/1950 | Manson | 24/241 PP |
| 4,434,536 | 3/1984 | Schmidt et al. | 24/241 PP |

Primary Examiner—William E. Lyddane
Assistant Examiner—Peter A. Aschenbrenner
Attorney, Agent, or Firm—Salter & Michaelson

[57] ABSTRACT

A safety hook construction is operable for providing a simple, safe and durable interconnection between a safety belt, harness, etc., and a safety line. The safety hook comprises a hook body, a closure member pivotally mounted on the body and normally biased to a closed position wherein a mouth portion of the hook body is obstructed, and a latch mounted on the closure member which is normally biased to a locked position which prevents opening of the closure member. The safety hook is preferably formed so that the latch is pivotally mounted on the closure member and normally biased so as to engage a locking shoulder formed on the edge of the body opposite the mouth to prevent opening of the closure member. Accordingly, the hook can be operated with one hand, i.e., by placing it in the palm of the hand, depressing the latch with the thumb to effect disengagement from the locking shoulder, and thereafter moving the latch toward the palm of the hand with the thumb to simultaneously swing the closure member to its open position.

5 Claims, 6 Drawing Figures

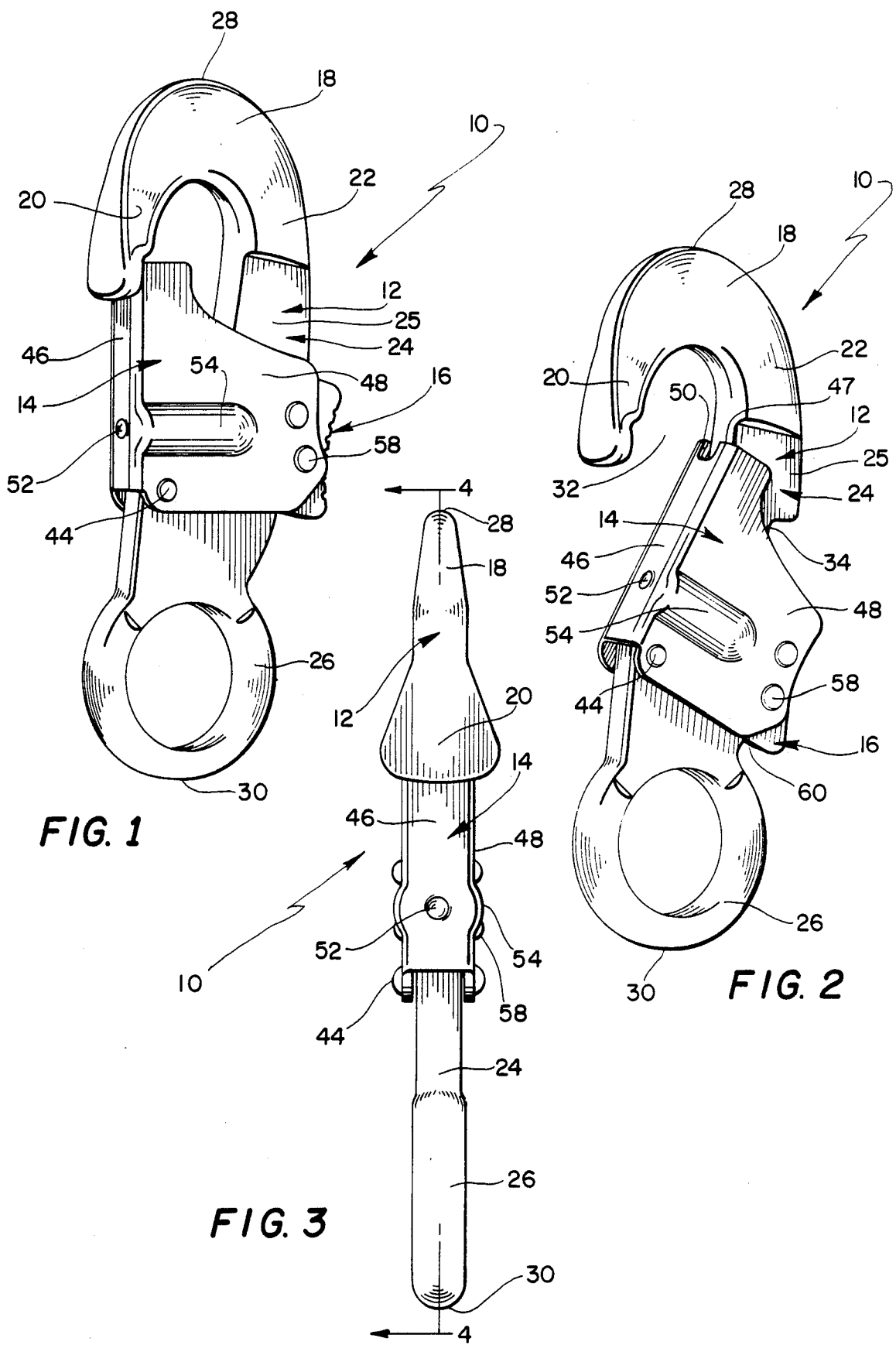

SAFETY HOOK CONSTRUCTION

BACKGROUND AND SUMMARY OF THE INVENTION

The instant invention relates to safety equipment and more particulary to a safety hook construction of the type used for securing safety belts, safety harnesses, etc., to safety lines and the like.

Safety belts and harnesses have heretofore been widely used in a variety of applications for securing wearers thereof to safety lines and the like, particularly for protecting the wearers from serious accidental falls. One of the most common applications for safety belts and harnesses is in the construction industry where construction workers are frequently required to work under hazardous conditions at high elevations. Safety belts and harnesses have frequently been worn by construction workers in situations of this type to prevent serious injury or death resulting from accidental falls from elevated areas. In this regard, while a safety belt attached to a safety line will not actually prevent a fall, it will normally limit the extent of the fall to only a few feet so that the amount of injury suffered by the worker will be minimized. For this reason, the use of safety belts has become almost mandatory for workers who are working in hazardous elevated areas.

Since the life of a person wearing a safety belt or harness may depend on the ability of the belt or harness and of a safety line to which it is attached to stop a fall, it is apparent that the safety hook which interconnects the safety belt or harness to the safety line must be of an effective, durable, and safe construction which does not permit the inadvertent detachment thereof from a safety line. In addition, however, it is important that the safety hook be capable of easy operation by the worker in order to assure that the interconnection thereof to a safety line is not neglected for reasons of convenience.

The instant invention provides a novel and effective safety hook construction which is not prone to inadvertent detachment from a safety line but which is nevertheless simple and convenient to operate. The safety hook construction of the instant invention comprises a hook body having a U-shaped or hook portion which defines a first end of the body and a shank portion which extends from one leg of the U-shaped portion and has an offset portion cooperating with the other leg to define the mouth or open portion of the hook. A closure member is pivotally mounted on the body and normally biased to a closed position wherein the mouth is obstructed, said closure member being inwardly pivotable to an open position wherein the mouth is at least partially unobstructed. The safety hook also includes a latch which is pivotally mounted on the closure member and normally biased to a locked position wherein it engages a locking shoulder on the body along the edge thereof opposite from the mouth to prevent the closure member from being pivoted inwardly to the open position thereof. The latch is, however, movable to an unlocked position wherein it is disengaged from the locking shoulder so that the closure member can be pivoted inwardly to the open position thereof when desired. The closure member is of hollow construction comprising an end wall which extends across the mouth when the closure member is in the closed position thereof, and a pair of spaced side walls extending therefrom over opposite sides of the shank portion. The closure member is pivotally mounted on the shank portion, and the latch is pivotally mounted on the closure member between the side walls thereof outwardly of the edge of the body opposite from the mouth. The latch is positioned on the closure member so that it normally engages the locking shoulder to prevent the closure member from moving to its open position, but so that it is disengageable from the locking shoulder by proper manipulation of the latch. Specifically, the closure member can be moved to the open position thereof by first depressing the latch to release same and thereafter moving the latch to impart opening pivotal movement to the closure member. Therefore, the safety hook can be operated by grasping it in one hand so that the end portion of the body opposite from the hook end is generally in the palm of the hand and so that the thumb is positioned on the latch. The hook can easily be moved to an open position thereof by manipulating the latch with the thumb to first disengage it and then to pivot the closure member. Accordingly, the safety hook is operable with a simple two-step procedure which can be carried out with one hand and without having to place one's fingers adjacent the mouth portion of the hook, which can be dangerous. However, despite the simplicity of the operation of the safety hook, the two-step operation outlined above must be carefully followed in order to disengage the safety hook from a safety line. Therefore, the chances of inadvertently disengaging the safety hook are extremely remote, so that the effectiveness of the safety hook can be relied upon.

Safety hooks representing the closest prior art to the instant invention of which the applicant is aware are disclosed in the U.S. Pat. No. 705,526 to Gray; Freysinger U.S. Pat. No. 1,879,168; Johnson U.S. Pat. No. 1,949,608; Duffy U.S. Pat. No. 1,964,428; and Tamada et al U.S. Pat. No. 4,062,092. While these references disclose a variety of safety hook constructions, most of which include some means for reducing the tendency for the inadvertent opening thereof, they do not teach a safety hook construction which reduces the chances of inadvertent opening to the extent achieved by the instant invention. They also do not teach a safety hook construction which is as effective and simple to operate as the safety hook construction of the instant invention, and further the specific structural features of the safety hook construction of the instant invention are clearly not suggested by these references. Accordingly, they are believed to be of nothing more than general interest.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of the safety hook construction of the instant invention in the closed position thereof;

FIG. 2 is a perspective view thereof in the open position thereof;

FIG. 3 is a front end view thereof;

DESCRIPTION OF THE INVENTION

Figures 4, 5, 6:
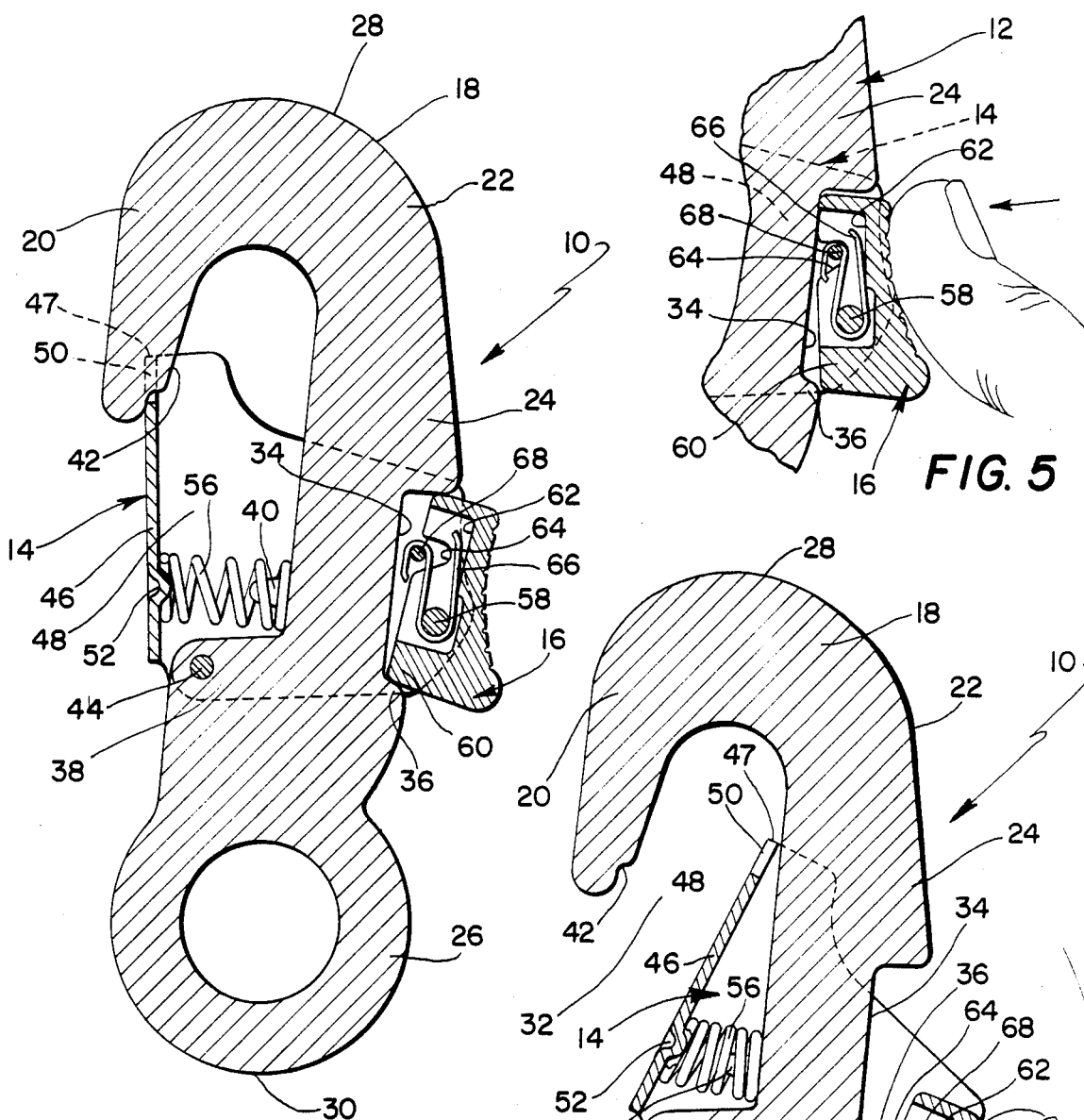
FIG. 4 is a sectional view taken along line 4—4 in FIG. 3.
FIG. 5 is a fragmentary sectional view illustrating the latch of the safety hook construction in a disengaged position.
FIG. 6 is a sectional view illustrating the movement of the closure member to the open position thereof after the disengagement of the latch.

Referring now to the drawings, the safety hook construction of the instant invention is illustrated in FIGS. 1 through 6 and generally indicated at 10 in FIGS. 1 through 4 and 6. The safety hook 10 comprises a hook body generally indicated at 12, a closure member generally indicated at 14 which is pivotally mounted on the body 12, and a latch generally indicated at 16 which is pivotally mounted on the closure member 14. When the safety hook 10 is in the closed position thereof illustrated in FIGS. 1 and 4, the latch 16 interengages with the body 12 to prevent opening of the closure member 14. The latch 16 is, however, movable to a disengaged position illustrated in FIG. 5 whereby the closure member 14 can be moved to the open position thereof illustrated in FIG. 6.

The body 12 comprises a U-shaped or hook portion generally indicated at 18 having first and second legs 20 and 22, respectively, and a shank portion 24 which extends from the second leg 22 of the U-shaped portion 18 terminating in a ring or eye 26. The U-shaped portion 18 defines a first end 28 of the body 12, whereas the shank portion 24 which has substantially flat sides 25 defines a second end 30 of the body 12 which is generally opposite from the first end 28. The shank portion 24 also cooperates with the U-shaped portion 18, specifically the first leg 20 thereof, to define a mouth 32 of the hook 10, as most clearly illustrated in FIGS. 2 and 6. The body 12 is preferably formed with a notch 34 along the edge of the shank portion 24 which faces generally opposite from the mouth 32, notch 34 being formed so that the extremity thereof which is closest to the second end 30 of the body 12 defines a shoulder 36 which faces generally towards the first end 28. Along the inner side of the shank portion 24, i.e., the side thereof which faces the mouth 32, a jaw 38 projects outwardly, and a spring retainer pin 40 is integrally formed in the shank portion 24 adjacent the jaw 38, but on the side thereof towards the first end 28 of the body 12. The body 12 is also formed so that the first leg 20 of the U-shaped portion 18 is of generally tapered configuration having a longitudinally extending ridge 42 along the inner side thereof which terminates in slightly spaced relation from the terminal end of the leg 20.

The closure member 14 is pivotally mounted on the body 12 so that it is alternately positioned in a closed position thereof wherein it obstructs the mouth 32 or an open position thereof wherein the mouth 32 is unobstructed, and therefore access to the interior of the U-shaped portion 18 is provided. In this regard, the closure member 14 is pivotally mounted on the jaw 38 by means of a pin 44 and comprises an end wall or elongated arm portion 46 having an unconnected or free end 47, and a pair of spaced side walls 48 which extend from opposite longitudinal side edges of the arm portion 46. The pin 44 extends between the walls 48 to pivotally mount the closure member 14 with the walls 48 extending along the opposite sides 25 of the shank portion 24. The arm portion 46 is formed with a notch 50 which extends inwardly from the unconnected end 47, and a depression 52 is provided at an intermediate point in the arm 46. Elongated rounded embossments 54 are formed in the walls 48 so that they extend in generally perpendicular relation from the arm 46 in the area thereof where the depression 52 is formed. Accordingly, when the closure member 14 is moved to the open position, portions of the walls 48 are moved toward the second end 30 of the body 12. As will be seen most clearly from FIGS. 4 and 6, the closure member 14 is biased to the closed position thereof by means of a coil spring 56 which is received at opposite ends thereof on the pin 40 and on the depression 52 and is contained by the generally tubular area defined between the embossments 54. The spring 56 urges the arm 46 in a counterclockwise direction so that the free end thereof engages the first leg 20 adjacent the end thereof and so that the ridge 42 is received in the notch 50.

The latch 16 is pivotally mounted on the closure member 14 so that it is disposed outwardly from the shank portion 25 along the edge of the body 12 opposite from the mouth 32, i.e. the edge of the body 12 which faces generally outwardly and away from the edge thereof along which the mouth 32 is formed. More specifically, the latch 16 is pivotally mounted between the side walls 48 by means of a pin 58, and it is positioned on the closure member 14 and dimensioned so that when the closure member 14 is in the closed position thereof, the latch 16 is receivable in the notch 34. In this regard, the latch 16 is formed with a corner 60 on the inner extremity thereof which is closest to the second end 30 and it is pivotally mounted on a portion of the closure member 14 which is moved toward the second end 30 when the closure member 14 is in the open position thereof. As will be seen most clearly from FIG. 4, when the closure member 14 is in the closed position thereof, the latch 16 is receivable in the notch 34 so that the corner 60 engages the shoulder 36 to prevent the inward pivoting of the closure member 14 to the open position thereof. The latch 16 is, however, mounted so that it is resiliently depressible to release the corner 60 from engagement with the shoulder 36 to permit the closure member 14 to be pivoted inwardly. Specifically, the latch 16 is formed with a hollow cavity 62 therein, and a notch 64 extends inwardly from the inner edge of the latch 16. A spring member 66 is received in the cavity 62 so that it extends around the pin 58 as well as around a second pin 68 which extends between the side walls 48 but is not otherwise attached to the latch 16. The spring member 66 biases the latch 16 to the engaged position thereof illustrated in FIG. 4 wherein the corner 60 is in engagement with the shoulder 36, but the portion of the latch 16 closest to the first end 28 of the body 12 is spaced outwardly from the inner wall of the notch 34. As illustrated most clearly in FIG. 5, the latch 16 is movable to a disengaged position by depressing the end thereof closest to the first end 28 so that the latch 16 pivots on the pin 58 to move the corner 60 outwardly. As the latch 16 is pivoted in this manner, the notches 64 provide clearance for the pin 68 so that the latch 16 can be pivoted to the extent required for the disengagement of the corner 60 from the shoulder 36.

For use and operation of the safety hook 10, the body 12 is secured at the second end thereof to a safety hook or harness or, in the alternative, to a safety line through the eye portion 26. The hook 10 is then secured to a ring or loop on a safety line or, in the alternative, to a ring or loop on a safety belt or harness in cases when the hook 10 is secured to a safety line by means of the eye 26. In either case, the safety hook 10 provides a safe, convenient, reliable, and effective interconnection between the safety belt or harness and the safety line. In this regard, the hook 10 is interconnected to the appropriate ring or loop by grasping the hook 10 so that the second end 30 of the body portion 12, including the eye 26, is received in the palm of one's hand. The latch 16 is then depressed in the manner illustrated in FIG. 5 so that the portions of the latch 16 closest to the first end 28 are pivoted inwardly and so that the corner 60 is pivoted outwardly to release it from the shoulder 36. After the latch 16 has been released in this manner, it is moved generally towards the second end 30 to pivot the closure member 14 so that the closure arm 46 is moved inwardly to a position wherein the mouth 32 is unobstructed as illustrated in FIG. 6. After the closure member 14 has been moved to the open position thereof in this manner, the hook 10 is interconnected with an appropriate ring or loop simply by inserting the ring or loop onto the first leg 20 of the U-shaped portion 18. Thereafter, the latch 16 is released so that it automatically returns to the closed position thereof illustrated in FIG. 4. Specifically, when the thumb is released from the latch 16, the closure member 14 is automatically resiliently urged to the closed position thereof by means of the spring 56; and as soon as it reaches the closed position thereof wherein the arm 46 engages the first leg 20, the spring member 66 automatically moves the latch 16 to the locked or engaged position thereof illustrated in FIGS. 1 and 4. In particular, as soon as the closure member 14 reaches the closed position thereof, the latch 16 is pivoted by the spring member 66 so that the corner 60 passes into the notch 34 and engages the shoulder 36 whereby the latch 16 locks the closure member 14 in the closed position thereof to prevent the inadvertent opening of the safety hook 10. Further, when the closure member 14 reaches the closed position thereof, the ridge 42 is received in the notch 50 whereby lateral or transverse movement of the end 47 of the closure member 14 relative to the first leg 20 is prevented.

It is seen, therefore, that the instant invention provides an effective safety hook construction which is both safe and easy to operate. The safety hook 10 can be easily operated by an operator using a single hand in the manner hereinabove set forth and without the user's fingers having to engage the arm 46. However, the likelihood of the safety hook 10 becoming inadvertently opened is negligible. In this regard, because the safety hook 10 actually requires a two-step manipulation for the opening thereof, i.e., the latch 16 is first depressed inwardly and thereafter moved towards the second end 30 of the body 12, the chances of this two-step operation occurring accidentally or inadvertently are extremely unlikely. Accordingly, the safety hook 10 can be relied upon for providing a safe interconnection to a safety line under virtually all conditions. For these reasons, as well as the other reasons hereinabove set forth, it is seen that the safety hook construction of the instant invention represents a significant advancement in the art which has substantial merit for its commercial value as well as its value from a safety standpoint.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:
1. A safety hook construction comprising:
   a. a hook body having a U-shaped portion which defines a first end thereof, and a shank portion which extends from one of the legs of said U-shaped portion to define a second end of said body and cooperates with the other of said legs to define a mouth along one edge of said body;
   b. a closure member pivotally mounted on said body and biased to a closed position wherein said mouth is obstructed by said closure member, said closure member being inwardly pivotable to an open position wherein said mouth is at least partially unobstructed and wherein a portion of said closure member is moved toward said body second end; and
   c. a latch pivotally mounted on said closure member, said latch being biased to a locked position wherein it engages said body along the edge thereof which faces outwardly and generally away from said edge along which said mouth is formed to prevent the inward pivoting of said closure member from the closed position thereof, said latch being pivotable to an unlocked position wherein it is disengaged from said body to permit inwardly pivoting of said closure member, said latch being mounted on said portion of said closure member which is moved toward said body second end when said closure member is pivoted to said open position and being operable for moving said closure member to said open position by moving said latch toward said body second end when said latch is in the unlocked position thereof.

2. In the safety hook construction of claim 1, said body having a shoulder formed thereon along said edge thereof which faces outwardly and away from said edge along which said mouth is formed, said shoulder facing generally toward said body first end, said latch engaging said shoulder when said latch is in the locked position thereof to prevent the inward pivoting of said closure member.

3. In the safety hook construction of claim 2, said body having a notch formed therein along said edge thereof which faces outwardly and away from said edge along which said mouth is formed, said shoulder defining the end of said notch closest said body second end, said latch being received in said notch when it is in the locked position thereof.

4. In the safety hook construction of claim 3, the portion of said latch closest to said body first end being resiliently depressible to move said latch to the unlocked position thereof.

5. In the safety hook construction of claim 2, said closure member comprising:
   a. an elongated arm portion which extends across said mouth when said closure member is in the closed position thereof;
   b. a pair of spaced side walls which extend from opposite longitudinal edges of said arm portion, said shank portion being interposed between said side walls, said side walls being pivotally secured to said shank portion to pivotally mount said closure member on said body, said latch being pivotally mounted on said closure member between said side walls outwardly of said edge of said body which faces outwardly and away from said edge along which said mouth is formed.

* * * * *